United States Patent [19]
Jeffries et al.

[11] Patent Number: 5,896,959
[45] Date of Patent: Apr. 27, 1999

[54] BI-DIRECTIONAL DAMPER WITH A SELF-CENTERING MECHANISM

[75] Inventors: Mark S. Jeffries; Maurice Ladd, both of Florence, S.C.

[73] Assignee: AVM, Inc., Marion, S.C.

[21] Appl. No.: 08/816,360

[22] Filed: Mar. 13, 1997

[51] Int. Cl.$^6$ .......................................... F16F 1/00
[52] U.S. Cl. .......................................... 267/250; 267/150
[58] Field of Search .............................. 267/150, 249, 267/250, 251, 252

[56] References Cited

U.S. PATENT DOCUMENTS 2,756,071  7/1956  Riva .............................. 267/250

*Primary Examiner*—Matthew C. Graham
*Attorney, Agent, or Firm*—McAndrews, Held & Malloy, Ltd.

[57] ABSTRACT

A self centering, bi-directional, non-cavitating damper that includes a cylindrical damper body and a piston assembly having a piston reciprocally movable in the damper body and a piston rod connected and movable with the piston. A tube is connected with the piston rod and is spaced about and radially from the damper body so that the tube and damper body may move axially, relative to each other, but are normally positioned in centered positions with respect to each other. First and second plastic washers are positioned between the damper body and the tube. At least one coil compression spring is positioned between the damper body and the tube and biases the washers apart axially to their normal positions. Each washer is prevented from moving apart beyond its normal position, but is movable toward the other washer, against the bias of the spring, when relative movement, from their normal positions, occurs between the damper body and the tube.

15 Claims, 1 Drawing Sheet

BI-DIRECTIONAL DAMPER WITH A SELF-CENTERING MECHANISM

BACKGROUND OF THE INVENTION

The present invention relates to dampers. More particularly, our invention relates to self-centering, bi-directional dampers that may be used, for example, in connection with controlling the operation of hydrostatic transmissions, such as those employed in commercial lawn mowers.

Dampers have long been known. Generally speaking, traditional damper designs employ a tubular body that defines an elongated, closed chamber filled with an incompressible fluid or liquid. A piston and shaft assembly are disposed within the damper body chamber so that one end of the shaft extends out of the chamber. The dampening rate of the damper is determined by the rate of fluid flow across the piston assembly as the piston assembly is moved relatively with respect to the damper body. Valves or other means are carried by the piston assembly and serve to control the fluid flow across the piston assembly.

So-called, non-cavitating dampers are also known. They provide an important advantage, vis-avis, traditional damper designs, in that they eliminate the problems of "cavitation" or "free fall" inherent in the traditional damper designs. Non-cavitating dampers are orientation insensitive in use and may thus be utilized in many more and different applications than traditional dampers.

The long recognized primary function of dampers has been to dampen the movements of relatively fixed and relatively movable members. Nevertheless, however, dampers have not been cast competitive for use before with the hand operated levers that are often employed to control the operation of hydrostatic transmissions such as those used to power commercial lawn mowers. These operating levers are usually pivotally mounted on the mower, at their lower ends, and when the transmissions are in neutral, that is, are not powering the lawn mower, the levers are usually disposed vertically in an upright, centered position. The operator moves the operating lever from its centered or "neutral" position, either forward or rearward, to control the direction of movement—in the forward or rearward direction—and the speed of movement of the mower.

In the past, a variety of spring arrangements have been used to assure that the operating lever is returned to its neutral or centered position after the operator has moved the lever and then let it go. While the prior spring arrangements generally worked as they were intended, they did and do have serious disadvantages. The springs could and did cause the operating lever to return too quickly from a "fast" forward or "fast" rearward operating position to its neutral or centered position after the operator releases the lever. This can cause the mower to dip abruptly and/or to stop too suddenly. Such dipping and/or abrupt stoppages pose serious safety hazards for the operator. Also, the mower transmission may suffer serious "shock" damage due to the spring arrangement causing the operating lever to return through and pass its neutral position. Current spring arrangements also tend to be relatively expensive because of the number of parts and the time and labor costs involved in manufacturing and installing.

Using traditional dampers, in place of spring arrangements, would not appear to provide a practical solution to the problems arising from employing current spring arrangements to re-position the operating level back to its neutral position. To be effectively used with most operating levers, the damper would have to be oriented horizontally or nearly horizontally. Such an orientation would result in serious potential cavitation problems. Non-cavitating dampers appear to perhaps be a possible, partial solution, but they still have the potential of permitting the operating lever to return through and past its neutral position.

BRIEF SUMMARY OF THE INVENTION

In principal aspects, the improved self-centering, bi-directional damper of our present invention is particularly adapted to control the movement of an operating lever or linkage for a hydrostatic transmission, such as used in commercial lawn mowers, so as to obviate the disadvantages of the spring arrangements heretofore employed to that purpose. Our improved damper permits the operator to readily move the operating lever in either direction from a centered or neutral position and then to have the lever be returned to, and only to its neutral position in a controlled manner. Our improved damper not only prevents any possibility of "shock" damage to the transmission, but also importantly, prevents the mower from ever dipping unexpectedly and/or stopping too suddenly upon the operator's release of the operating leaves.

The improved damper of our invention includes a novel self-centered mechanism that is self activated and that provides a positive centering action which always returns the damper components to and only to their centered positions. The utility of our invention is greatly enhanced when the damper incorporates a non-cavitating design. As noted, non-cavitating dampers may be employed in any orientation. This is an important advantage because a damper, if it is to be used with such a vertically disposed operating lever—such as the hydrostatic transmission operating levers normally found on commercial lawn mowers—must be generally horizontally oriented, and accordingly, should be of a non-cavitating design for maximum effectiveness.

Another significant advantage of our present invention is that the cost of manufacturing and mounting our improved damper on a commercial lawn mower is considerably less than the overall cost of manufacturing and installing the spring arrangements, such as currently used with lawn mower operating levers. Considerable savings are the labor costs involved in installing the improved damper, versus the spring assemblies, are considered. Further, our present damper is more durable and can be more easily protected against, for example, the weather and the environment than the present spring arrangements.

Accordingly, it is a principal object of our present invention to provide an improved self-centering, bi-directional damper. A related object of the present invention is to provide an improved bi-directional damper that has a novel self-centering mechanism which is self-activated and which provides a positive centering action for always returning the damper components to and only to their centered positions. Still another related object of the present invention is to provide a self-centering, bi-directional damper of the type described that has particular utility in returning pivoted operating levers—such as those employed to control the operation of the hydrostatic transmissions in commercial lawn mowers—to their centered or neutral positions at a controlled rate regardless of the speed of the mower when the operator releases the lever. A further related object of the present invention is to provide an improved self-centering damper of the type described where the damper has a non-cavitating design.

Another object of the present invention is to provide an improved self-centering, bi-directional damper of the type described where the damper has a damper body that includes first and second ends, a central longitudinal axis extending between the first and second ends, and a closed, fluid filled chamber; where the damper body also has an outwardly facing, outer surface defined between one and another surface ends; where the damper includes a piston assembly having a piston and a piston rod; where the piston is reciprocally movable within the damper body chamber in a first, piston extension direction and in a second, piston compression direction; where the piston rod has a first end and a central longitudinal axis and is connected with the piston so that the first end of the piston rod extends out of the damper chamber through the first end of the damper body and so that the longitudinal axes of the piston rod and damper body are coaxial; where means are adapted for attaching a second end of the damper body to a first body and for connecting the first end of the piston rod to a second body so that the damper is positioned to dampen relative movement between the first and second body; where the damper also includes first and second members, each having a central longitudinal axis, an outwardly facing outer surface, and an inwardly facing inner surface; where the first and second members are disposed adjacent to the outer surface of the damper body so that their inner surfaces are in surface-to-surface contact with the outer surface of the damper body and so that the first and second members may move relatively to the outer surface of the damper body; where the first and second members are normally positioned adjacent to the one end and the other end, respectively, of damper body's outer surface; where the damper further includes a third member having first and second ends, and a central longitudinal axis; where the third member has an inwardly facing inner surface defined between one and another surface ends; where the third member is connected and movable with the piston rod and is disposed about the damper body; where the outer surfaces of the first and second members are in surface-to-surface contact with the inner surface of the third member; where the first and second members may move relatively to the inner surface of the third member; where the third member and the damper body are normally positioned, in their centered positions, with respect to each other; where one and the other ends of the outer damper body's outer surface are adjacent to the one and the other ends of the third member's inner surface, respectively; where the third member and the damper body may each move relatively, in the first and second directions, with respect to their normal positions and with respect to each other; where the damper also includes means biasing the first and second members apart in directions parallel to their longitudinal axes so that when the damper body and the third member are in their normal positions, the first and second members are in disposed in their normal positions; where means are included for preventing the first and second members for moving from their normal position in the first and second directions, respectively, with respect to the third member and the damper body; and where means are included for moving the first and second members from their normal positions in the second and first directions, respectively, against the bias of the biasing means when the third member and the damper body are moved relatively, with respect to each other and with respect to their normal positions, in the second and first directions, respectively.

Still another object of the present invention is to provide an improved self-centering, bi-directional damper of the type described wherein the central longitudinal axes of the first, second and third members are coaxial with the longitudinal axes of the damper body; where the outer surface of the damper body is generally annular and faces radially outwardly with respect to the longitudinal axis of the damper body; where the third member is a tube; where the inner surface of the tube is radially and evenly spaced from the outer surface of the damper body and faces radially inwardly with respect to the longitudinal axis of the damper body; where the first and second members are first and second annular washers; and where the inner and outer surfaces of the first and second washers face radially inwardly and outwardly, respectively, with respect to the central longitudinal axis of the damper body. A related object of the present invention is to provide an improved self-centering damper of the type described where the outer surface of the damper body and the inner surface of the tube, in a direction parallel to the longitudinal axis of the damper body and between the one ends and the other ends thereof, have substantially the same length; where the lengths, in a direction parallel to the longitudinal axis of the damper body, of the outer and inner surfaces of the first and second washers are substantially the same and where the inner and outer surfaces of the tube and the damper body, respectively, are continuous between their one ends and their other ends. A further related object of the present invention is provide an improved self-centering damper of the type described where the biasing means includes at least one coil compression spring; and where each spring is disposed between the tube and the damper body so that the longitudinal axis of the spring is coaxial with the longitudinal axis of the damper body.

These and other objects, benefits and advantages of the present invention will become more apparent from the following description of the preferred embodiment of our present invention, which is described in connection with the following drawings.

DETAILED DESCRIPTION OF THE INVENTION

Figure 1:
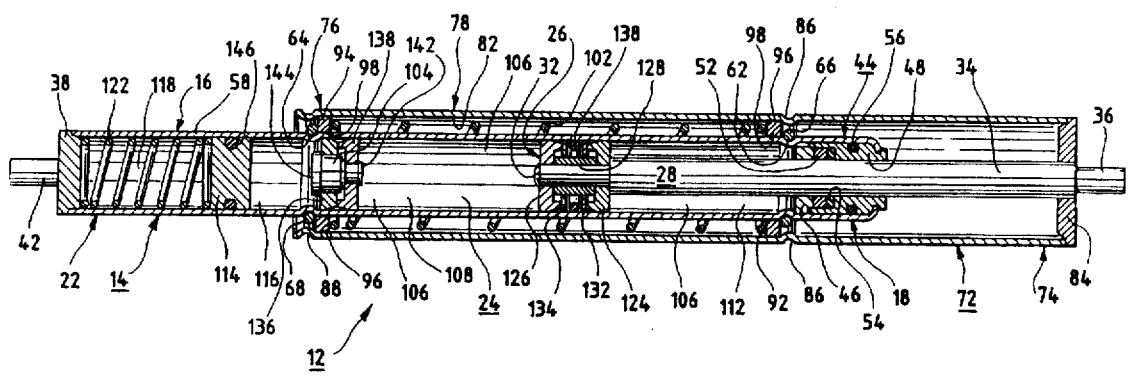
FIG. 1 is a longitudinal, vertical cross-sectional view of a preferred embodiment of these self-centering, bi-directional damper of the present invention.

A preferred embodiment of the improved self-centering, bi-directional damper of our present invention is indicated generally at 12 in FIG. 1. Damper 12 includes a generally tubular body or housing 14 that has an annular side wall 16. The body has a first end 18, a second end 22 and, a longitudinal central axis extending between the ends 18 and 22. The side wall 16 and the ends 18 and 22 generally define a closed, axially elongated cavity 24 that is filled, as explained below, in part with an incompressible fluid or liquid and in part, with a compressible gas.

A piston assembly 26 is disposed within the cavity 24. As is later described in more detail, the piston assembly 26 is movable, back and forth, parallel to the longitudinal central axis of the second end 22, and relatively with respect to the body 14. As also later described in more detail, the piston assembly is of a conventional design and construction.

A piston rod 28 is connected at its one end 32 with the piston assembly 26 in a conventional manner. The longitudinal axis of the piston rod 28 is co-axial with the longitudinal axis of the body 14. The other end 34 of the piston rod 28 extends out of the first end 18 of the body 14.

A conventional connector 36 is mounted on the other end 34 of the piston rod 28. The connector 36 is adapted to connect by means of, for instance, a conventional ball type connector (not shown), the piston rod 28, and thus the piston assembly 26, with a relatively movable body (also not shown) to be damped. An example of such a relatively movable body is the operating lever of a hydrostatic transmission of a commercial lawn mower.

The second end 22 of the body 14 is closed and sealed by an end cap 38 that is secured to the end 22. The end cap 38 includes a conventional connector 42 that is adapted to connect the end cap 38, and thus the body 14, for instance, to a relatively fixed body (also not shown). An example of such a relatively fixed body is a fixed portion of a commercial lawn mower adjacent to the mower's operating lever.

A conventional shaft seal assembly 44 is disposed within and serves to close the first end 18 of the body 14 and seal the piston rod 28 as it reciprocally moves with respect to the body 14. Specifically, the piston rod 28 extends slidably through a central, axial opening in the assembly 44 in a conventional manner. The shaft seal assembly 44 includes a retainer 46 (which is press fit within the body 14), a bushing 48, an annular shaft seal 52 and a teflon ring 54, all of which surround the piston rod 28. An O-ring 56 is disposed in an annular groove in the external radially outwardly facing surface of the bushing 48 and serves as a seal between the bushing 48 and the adjacent portion of the inner surface of the body wall 16. The end of the wall 16, which defines the first end 18 is swaged inwardly so as to assist in securing the shaft seal assembly 44 within the body 14.

The annular sidewall 16 of the body 14 has a radially outwardly facing outer surface 58. First and second radially inwardly extending, annular grooves 62 and 64 are defined in the surface 58 and open or face radially outwardly. The first groove 62 is near the first end 18, and more specifically, just to the left of the retainer 46, as shown in FIG. 1. The second annular groove 64 is a predetermined distance to the left (again as seen in FIG. 1) from the groove 62. The outer surface 58, at least between the grooves 62 and 64, is smooth and continuous.

Retainer rings 66 and 68 are disposed within the grooves 62 and 64, respectively. The periphery of the rings 66 and 68 project radially outwardly beyond the plane of the surface 58 a predetermined, relatively small distance.

An elongated tube 72 is disposed radially (annularly) from and about the body 14. The tube has a first end 74, a second end 76, an annular side wall 78, and a longitudinal central axis that is co-axial with the longitudinal central axes of the body 14. The side wall 78 includes a radially inwardly facing, inner surface 82. The wall 72 is uniformly, radially spaced from the wall 16 of the body 14. When the tube 72 and the body 14 are in their respective "centered" or normal positions, with respect to each other as illustrated in FIG. 1, the tube overlies the first end 18 of the body.

The first end 74 of the tube 72 is attached to an end cap 84, which is, in turn, attached to the piston rod end 34 adjacent to the connector 36. The connection between the tube 72 and the piston rod 28 is such that the tube and piston rod always move together axially.

The second end 76 of the tube 72 is adjacent to the retainer ring 68 when the tube is in its centered or normal position relative to the body 14, as illustrated in FIG. 1. A radially inwardly extending, radially outwardly opening or facing annular groove 86 is in the tube side wall 78. This groove 86 extends radially inwardly beyond the plane of the inner surface 82 a pre-determined, relatively small distance. When the tube 72 and body 14 are in their centered positions, as shown in FIG. 1, the groove 86 is radially aligned with the ring 68.

A second radially inwardly extending, outwardly opening or facing annular groove 88 is in the tube side wall 78. This groove 88 is disposed adjacent to and in radial alignment with retaining ring 66 when the tube 72 and body 14 are in their centered positions. Like the groove 86, the groove 88 projects radially inwardly from the surface 82 a predetermined, relatively small distance.

First and second plastic annular washers 92 and 94 are disposed about the body 14, and between the body 14 and the tube 72. Each of these washers includes a central longitudinal axis, a radially outwardly facing, outer surface 96 and a radially inwardly facing, inner surface 98. The inner surfaces 98 and the outer surfaces 96 of the washers 92 and 94 are in surface-to-surface contact with the outer surface 58 of the body wall 16 and the inner surface 82 of the tube 78, respectively. The radial dimensional spacings between the surfaces 96 and 98 and between the surface 58 and 82 are preselected, however, such that the washers 92 and 94 may readily slide axially with respect to the surfaces 58 and 82.

A coil compression spring 102 is disposed about the body 14 and between the body 14 and the tube 72. The longitudinal axis of the spring 102 is co-axial with the longitudinal axis the body 14. In practice, it may be preferable to use two or even more coil compression springs, instead of just one spring 102. When more than one spring is used, the facing ends of the springs may be separated by additional plastic washer(s) that would have similar construction and function to the washers 92 and 94. The advantage of using more than one coil compression spring, as opposed to the single spring 102, is that because of its length, the spring 102 might tend to rub against the surface 82 when compressed during use such as is later described.

The spring 102 biases the washers 92 and 94 apart, that is, the washer 92 to the right and washer 94 to the left, as shown in FIG. 1, to their "normal" or centered positions. As mentioned above, the rings 66 and 68 project radially outwardly toward the tube 72, and the grooves 86 and 88 extend radially inwardly toward the body 14 relatively small predetermined distances. When in its normal position, the washer 92 abuts against the retaining ring 66 and the groove 86. Similarly, when in its normal position, the washer 94 abuts against the retaining ring 68 and the groove 88. As a result, the abutments between the washer 92 and ring 66 and/or groove 86 prevents the washer 92 from being moved to the right (as shown in FIG. 1) from its normal position relative to the tube 72 or the body 14, respectively, but that ring 66 or groove 86 can cause the washer 92 to slide to the leftward, relative to tube or the body, respectively, toward the washer 94 and against the bias of the spring 102. Similarly, the abutment between the washer 94 and the ring 68 and/or the groove 88 prevents the washer 94 from being moved to the left (as shown in FIG. 1) from its normal position relative to the tube 72 or body 14, respectively, but that ring 68 or groove 88 can cause the washer 94 to slide to the right, relative to the tube or the body, respectively, toward the washer 92 and against the bias of the spring 102.

As previously noted, FIG. 1 illustrates the body 14 and the tube 72 as when they are in their normal or centered positions with respect to each other. If, however, the tube 72 is moved to the right, as shown in FIG. 1, relative to the body 14, because of, for instance, the operator moving the operating lever in that same direction, the groove 88 will cause the washer 94 to move also to the right, against the bias of the spring 102, relative to the body 14. The washer 92 will not, however, move to the right, relative to the body 14, because of its abutment with the retaining ring 66. This is true even though the groove 86 moves, as it must, to the right with the tube 72.

When the operator releases the operating lever, the bias of the spring 102, acting through the washer 94 and the groove 88, urges the tube, and thus the piston assembly 26, to move to the left, as shown in FIG. 1. The rate of the leftward movement of the tube 72 (and the piston rod 28 and piston assembly 26) is controlled by the rate of flow of the fluid in the cavity 24 through the piston assembly. However, all leftward movement of the tube (and the piston rod and piston assembly) will stop as soon as the tube returns to its normal or centered position, with respect to the body 14, that is, when the washer 94 again abuts the retainer ring 68.

Similarly, if the body 14 were to be moved to the left, relative to the tube 72, the retaining ring 66 will cause the washer 92 to likewise move to the left against the bias of the spring 102, relative to the tube 72. The washer 94 will be held against leftward movement by the groove 88 even though the retaining ring 68 will move to the left with the body 14. Again, as soon as the force causing such relative movement ceases, the bias of the spring 102, acting through the washer 92 and the ring 66, will cause the body and the tube to again assume their centered or normal position. As before, the rate at which the body returns to its normal or centered position depends upon the rate at which the fluid in the cavity 24 flows pass the piston assembly 26.

In sum, the improved self-centering, bi-directional damper of 12 includes a novel, practical, efficient and facile way of readily returning the tube 72 and the damper body 14 to their normal or centered positions after there has been relative movement between them. Additionally, because of the abutments between the washers 92 and 94 with the rings 66 and 68 and with the grooves 86 and 88, both respectively, the tube and the body can never return past their centered positions.

As stated before, the preferred embodiment of the damper 12 has a non-cavitating design since such a design permits the damper to be employed in any orientation. The preferred non-cavitating damper design will now be described:

A first assembly 104 is mounted within the cavity 24 between the ends 18 and 22 of the body 14. The first assembly 104, the first body end 18 and the body wall 16 define a first chamber portion 106 of the cavity 24. The first assembly 104 does not move relative to the body 14.

The piston assembly 26 is disposed within the first chamber portion 106 and between the first assembly 104 and the first body end 18. The piston assembly is able to move, back and forth parallel to the longitudinal central axis of the cavity 24, relatively with respect to the body 14 within the first chamber portion 106 and between the first assembly and the first body end 18.

The movable piston assembly 26 sub-divides the first chamber portion 106 into a compression sub-portion 108, which is defined between the first assembly 104 and the piston assembly 26, and an extension chamber sub-portion 112, which is defined between the piston assembly and the first body end 18, or more particularly, the shaft seal assembly 44. The volumes of the sub-portions 108 and 112 will, of course, vary as the piston assembly 26 moves within the first chamber portion 106 relative to the body 14.

A floating piston 114 is disposed within the cavity 24 between the first assembly 104 and the second body end 22 and may move within the cavity 22, in a direction parallel to the longitudinal axis of the body 14, between the first assembly 104 and the second body end 22. A second chamber portion 116 of the cavity 22 is defined between the floating piston 114 and the first assembly 104. A third chamber portion 118 is defined in the cavity 24 between the floating piston 114 and the second body end 22, which as noted, is closed and sealed by the end cap 38.

A fluid such as one of the fluids conventionally used in dampers of this type, fills the first and second chamber portions 106 and 116. A gas, such as conventionally used in gas springs, fills third chamber portion 118. The gas may be pressurized although it can also be at atmospheric pressure.

A conventional coil compression spring 122 is disposed within the third chamber portion 118 of the body 14 and between the end cap 38 and the floating piston 114. The spring 122 serves to bias the floating piston 114 away from the end cap 38. The pressure of the gas in the third chamber portion 118 and the bias of the coil compression spring 122 are sufficient such that the improved damper 12 performs as described later.

Referring now to the piston assembly 26, a pair of structurally identical, annular orifices plates 124 and 126 are mounted on the reduced diameter end 32 of the piston rod 28 in a conventional manner. An annular spacing member 128 is also mounted, on the reduced diameter end 32, between the plates 124 and 126 and serves to hold the plates 124 and 126 in a separated, fixed spaced relationship.

As shown in FIG. 1, each of the plates 124 and 126 has a generally cup shaped cross-section, with the distal or open ends of the plates 124 and 126, respectively, facing each other. The diameters of the annular, radially outwardly facing surface of the plates 124 and 126 are less than the diameter of the inner surface of the adjacent body wall 16 throughout the first chamber portion 106. As a result, fluid may readily pass between these outer surfaces of the plates and the body wall 16.

A pair of annular, relatively thin washers 132 and 134 are mounted on the spacing member 128 and extend radially between the member 128 and the body wall 16. The radial inner diameters of the washers 132 and 134 are such that the washers may readily move or slide, back or forth (in a direction parallel to the longitudinal central axis of the shaft 28) along and with respect to the spacing member 128, and thus also with respect to the plates 124 and 126 when the piston assembly 26 moves. The radial outer diameters of the washers 132 and 134 are less than the diameter of the inner surface of the body wall 16, and this facilitates the aforesaid movement of the washers.

An O-ring 136 is disposed about the spacing member 128 and between the washers 132 and 134. The O-ring 136, which moves with the piston assembly 26, serves to seal the space between the body wall 16 and one of the washers 132 or 134 when the O-ring is a adjacent to that one washer.

The distal ends of the orifices plates 124 and 126 have one or more radially directed grooves (not shown) formed therein, preferably by coining. The number and size of these grooves determine the rate that fluid can flow between a washer 132 or 134 and the adjacent distal end of the plates 124 or 126, respectively when the washer is forced and held against the distal end during relative movement between the body 14 and the piston assembly 26.

To recap, a fluid flow path is defined across the piston assembly 26, and thus between the compression sub-portion 108 and the extension sub-portion 112. This flow path includes the spacings between the radially outwardly facing surfaces of the plates 124 and 126 and the body wall 16, between the distal ends of the plates 124 and 126 and the washers 132 and 134, and between the radially inwardly facing surfaces of the washers 132 and 134 and the spacing member 128. When a washer 132 or 134 is abutted against its adjacent distal end of the plate 124 or 126, the grooves in that distal end serve as most the restricted portion of the fluid flow path. When a washer is spaced from its adjacent distal end, this portion of the fluid flow path (that is, the portion between the washer and the distal end) is much larger. By preselecting the size and number of grooves in the plates 124 and 126, the fluid flow rates, and thus the damper extension and compression rates, can be pre-determined for various anticipated damper uses.

In sum, when relative movement occurs between the body 14 and the piston assembly 26, such that the piston assembly 26 moves relatively toward the first assembly 104, fluid in the sub-portion 108 flows across the piston assembly 26 to the sub-portion 112. Specifically, fluid flows between the radially outwardly facing surfaces of the orifice plate 126 and the wall 16, between the distal end of the plate 124 and the washer 134, which at this time, are spaced apart, and between the radially inwardly facing surfaces of the washer 134 and the spacing member 128. The fluid flow continues between the radially inwardly facing surface of the washer 132 and the spacing member 128. Due to the relative movement of the piston assembly 26, the washer 132 is forced and abutted tightly against the distal end of the plate 124. Since the grooves in the distal end of the plate 124 are the only means by which the fluid can pass between the washer 132 and the plate 124, the size and number of these grooves, in effect, determine the rate of fluid flow across or past the piston assembly 26. Similarly, when the piston assembly 26 is moved relatively, with respect to the body 14, such that the assembly 26 moves away from the first assembly 104, the grooves in the distal end of the orifice plate 126 determine the rate of fluid flow across the piston assembly 26.

The first assembly 104 includes an annular flow washer 136 that is mounted within the body 14 such that its radially outwardly facing surface abuts the inner surface of the body wall 16 and such that the washer 136 cannot move or slide, axially or otherwise, with respect to the body 14. The assembly 104 also includes an annular orifice plate 138 which is structurally similar to the orifice plates 124 and 126. The distal end of the plate 138 faces toward the washer 136 (that is, toward the second end 22 of the body 14). The plate 138 is mounted on one end of a rivet 142 (that is, the end which faces the piston assembly 26). Specifically, the rivet 142 extends through the central opening in the annular flow washer 136, and its longitudinal axis is coaxial with the longitudinal axis of the body 14. The rivet 142 includes a head portion 144 on its end that faces the second body end 22. The portion 144 has a larger diameter than the central opening in the annular washer 136.

The respective radial dimensions of the center opening of the washer 136 and the adjacent radially outwardly facing surface of the rivet 144 are such that the rivet may move or slide back and forth (in a direction generally parallel to the longitudinal central axis of the body 14) relative to the "fixed" washer 136 and that fluid may flow therebetween. Like the distal ends of the orifice plates 124 and 126, the distal end of the plate 138 has one or more generally radially directed grooves therein, preferably formed by coining.

Fluid can flow across the first assembly 104 by flowing between the radially outwardly facing surface of the orifice plate 138 and the body wall 16, between the distal end of the plate 138 and the flow washer 136, and between the radially inwardly facing surface of the flow washer 136 and the radially outwardly facing surface of the rivet 142. The orifice plate 138 and the rivet 142 are secured together so that they move together, and as noted, the flow washer 136 is fixed with respect to the tubular wall 16 of the body 14. The rivet 142 and orifice plate 138 move between a first position where the distal end of the plate 138 tightly abuts against the adjacent side of the washer 136 and a second position where the distal end of the plate 138 is axially spaced from the washer 136. Again, the grooves in the distal end of the plate 138 serve as the only flow fluid path when the washer 136 and plate 138 are in the first position.

Hence, when the piston assembly 26 is moved relative to the body 14, such that the assembly 26 and the first assembly 104 move toward one another, the rate of fluid flow across the first assembly 104 (that is, from the compression chamber sub-portion 108 to the second chamber portion 116) is limited by the size and number of the grooves in the distal end of the plate 138. Similarly, when the piston assembly 26 moves, relatively, away from the first assembly 104, fluid may flow from the second chamber portion 116 to the compression chamber sub-portion 108, and the rate of fluid flow is not limited by the size and number of the grooves since the flow washer 136 and the orifice plate 138 are spaced apart.

The floating piston 114 includes a O-ring 146 disposed in a groove in its radially outwardly facing, annular surface. This O-ring forms a fluid/gas seal between the floating piston 114 and the adjacent body wall 16 so as to prevent leakage of fluid from the second chamber portion 116 to the third portion 118 and the leakage of gas from the third chamber portion 118 to the second chamber portion 116 as the piston 114 moves within the chamber 106.

When fluid flows from the compression chamber sub-portion 108 into the second chamber portion 116, the floating piston 114 tends to move toward the second body end 22, against the bias of the spring 122 and the gas in the third chamber portion 118. Conversely, when fluid flows from the second chamber portion 116 into the compression chamber sub-portion 108, the piston 114 moves toward the first assembly 104 under the bias of the spring 122 and the gas in the chamber portion 118. As a result of its movement, the floating piston 114 maintains pressure on the fluid in the second chamber portion 116 assuring that there will always be sufficient fluid in the first chamber portion 106 so that cavitation will not occur.

One of the advantages of the improved damper 12 of the present invention is that the damper may be used with an operating lever employed to control commercial lawn mowers. The damper 12 may, of course, be used for other purposes as, for instance, to support the driver's seat in a truck.

We claim:

1. In a bi-directional damper having a damper body including a first end, a second end, a central longitudinal axis extending between the first and second ends, and a closed, fluid-filled chamber, with the damper body also having an outwardly facing, outer surface defined between one surface end and another surface end; a piston assembly including a piston and a piston rod, with the piston being disposed in the damper chamber and being reciprocally movable within the damper chamber, through a predetermined distance, in a first, piston extension direction and in a second, piston compression direction, and with the piston rod having a first end and a central longitudinal axis and being connected with the piston so that the first end of the piston rod extends out of the damper chamber through the first end of the damper body and so that the longitudinal axes of the piston rod and the damper body are co-axial; and means adapted for attaching the second end of the damper body to a first body and means adapted for attaching the first end of the piston rod to a second body so that the damper is positioned to dampen relative moment between the first and second bodies, the improvement comprising:

a first member having a central longitudinal axis, an outwardly facing, outer surface and an inwardly facing, inner surface, with the first member being disposed adjacent to the outer surface of the damper body so that the inner surface of the first member is in surface-to-surface contact with the outer surface of the damper body and so that the first member may move relative to the outer surface of the damper body, and with the first member being normally positioned adjacent to the one end of the outer surface of the damper body;

a second member having a central longitudinal axis, an outwardly facing, outer surface and an inwardly facing, inner surface, with the second member being disposed adjacent to the outer surface of the damper body so that the inner surface of the second member is in surface-to-surface contact with the outer surface of the damper body and so that the second member may move relative to the outer surface of the damper body, and with the second member being normally positioned adjacent to the other end of the outer surface of the damper body;

a third member including a first end, a second end, and a central longitudinal axis extending between the first and second ends, with the third member having an inwardly facing, inner surface defined between one surface end and another surface end, with the third member being connected and movable with the piston rod, with the third member being disposed about the damper body with the outer surfaces of the first and second members being in surface-to-surface contact with the inner surface of the third member so that the first and second members may move relatively to the inner surface of the third members, with the third member and the damper body being normally positioned, in centered positions, with respect to each other, so that the one end of the outer surface of the damper body is adjacent to the one end of the inner surface of the third member and so that the other end of the outer surface of the damper body is adjacent to the other end of the outer surface of the third member, and with the third member and the damper body each being movable relatively, in the first direction and in the second direction, with respect to their normal, centered positions and with respect to each other;

means for biasing the first member and the second member apart, in directions parallel with their longitudinal axes, so that when the damper body and the third member are in their normal positions, each of the first and second members are disposed in their normal positions;

means for preventing the first member from moving from its normal position in the first direction with respect to the third member and the damper body;

means for preventing movement of the second member from its normal position in the second direction with respect to the third member and the damper body;

means for moving the first member from its normal position in the second direction, against the bias of the biasing means, when the third member and the damper body are moved relatively, with respect to each other and with respect to their normal positions, in the second direction; and means for moving the second member from its normal position in the first direction, against the bias of the biasing means, when the third member and the damper body are moved relatively with respect to each other and with respect to their normal positions in the first direction.

2. The improvement of claim 1 wherein the damper is a non-cavitating damper.

3. The improvement of claim 1 wherein the biasing means includes at least one coil compression spring that is disposed between the third member and the damper body and whose longitudinal axis is parallel with the central longitudinal axis of the damper body.

4. The improvement of claim 1 wherein the first end of the third member is connected to the first end of the piston rod.

5. The improvement of claim 1 wherein the central longitudinal axis of the damper body is co-axial with the central longitudinal axes of the first, second and third members; and wherein the first and second directions are parallel with the central longitudinal axis of the damper body.

6. The improvement of claim 1 wherein the central longitudinal axes of the first, second and third members are coaxial with the longitudinal axis of the damper body; wherein the outer surface of the damper body is generally annular and faces radially outwardly with respect to the longitudinal axis of the damper body; wherein the third member is a tube; wherein the inner surface of the tube is radially and evenly spaced from the outer surface of the damper body and faces radially inwardly with respect to the longitudinal axis of the damper body; wherein the first member is an annular first washer on which the inner and outer surfaces of the first member are disposed; wherein the second member is an annular second washer on which the inner and outer surfaces of the second member are disposed; and wherein the inner and outer surfaces of the first and second washers face radially inwardly and outwardly, respectively, with respect to the central longitudinal axis of the damper body.

7. The improvement of claim 6 wherein the length of the outer surface of the damper body, in a direction parallel to the longitudinal axis of the damper body and between the one end and the other end thereof, is substantially the same as the length of the inner surface of the tube, in a direction parallel to the longitudinal axis of the damper body and between the one end and the other end thereof.

8. The improvement of claim 7 wherein the lengths, in a direction parallel to the longitudinal axis of the damper body, of the outer and inner surfaces of the first washer are substantially the same; wherein the lengths, in a direction parallel to the longitudinal axis of the damper body, of the outer and inner surfaces of the second washer are substantially the same; and wherein the inner and outer surfaces of the tube and damper body, respectively, are continuous between their one ends and their other ends.

9. The improvement of claim 7 wherein the lengths, in a direction parallel to the longitudinal axis of the damper body, of the inner surfaces of the first and second washers are each less than five percent of the length, of the outer surface, in a direction parallel to the longitudinal axis of the damper body and between the one end and the other end thereof, of the damper body; wherein the lengths, in a direction parallel to the longitudinal axis of the damper body, of the outer surfaces of the first and second washers are each less than five percent of the length of the inner surface, in a direction parallel to the longitudinal axis of the damper body and between the one end and the other end thereof, of the tube; and wherein the inner and outer surfaces of the tube and damper body, respectively, are continuous between their one end and their other ends.

10. The improvement of claim 8 wherein the first and second directions are parallel with the central longitudinal axis of the damper body.

11. The improvement of claim 10 wherein the lengths of the inner and outer surfaces of the tube and damper body, respectively, are greater than the predetermined distance.

12. The improvement of claim 11 wherein the lengths, in a direction parallel to the longitudinal axis of the damper body, of the inner surfaces of the first and second washers are each less than five percent of the length of the outer surface, in a direction parallel to the longitudinal axis of the damper body between the one and other ends thereof, of the damper body; and wherein the lengths, in a direction parallel to the longitudinal axis of the damper body, of the outer surfaces of the first and second washers are each less than five percent of the length of the inner surface, in a direction parallel to the longitudinal axis of the damper body and between the one and other ends thereof, of the tube.

13. The improvement of claim 12 wherein the biasing means includes at least one coil compression spring; and wherein the spring is disposed between the tube and the damper body so that the longitudinal axis of the spring is coaxial with the axis of the damper body.

14. The improvement of claim 13 wherein the first end of tube is connected with the first end of the piston rod.

15. The improvement of claim 14 wherein the damper is a non-cavitating damper.

* * * * *